(12) United States Patent
Belenko et al.

(10) Patent No.: US 7,506,376 B2
(45) Date of Patent: Mar. 17, 2009

(54) COPY PROTECTION METHOD FOR DIGITAL MEDIA

(75) Inventors: Vyacheslav S. Belenko, St. Petersburg (RU); Vsevolod M. Kuzmich, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 616 days.

(21) Appl. No.: 10/061,364

(22) Filed: Feb. 4, 2002

(65) Prior Publication Data

US 2002/0114458 A1   Aug. 22, 2002

Related U.S. Application Data

(60) Provisional application No. 60/265,884, filed on Feb. 5, 2001.

(51) Int. Cl.
*H04L 9/00* (2006.01)
*H04L 9/32* (2006.01)
*G06F 11/30* (2006.01)
*G06F 12/14* (2006.01)
*G06F 7/04* (2006.01)

(52) U.S. Cl. .................. 726/26; 713/193; 713/165; 713/176; 713/170; 726/27

(58) Field of Classification Search .................. 713/193, 713/176, 165, 170; 726/26, 27
See application file for complete search history.

(56) References Cited

U.S. PATENT DOCUMENTS

| | | | |
|---|---|---|---|
| 5,809,139 | A | 9/1998 | Girod et al. |
| 5,974,150 | A | 10/1999 | Kaish et al. |
| 6,044,462 | A | 3/2000 | Zubeldia et al. |
| 6,148,342 | A | 11/2000 | Ho |
| 6,226,618 | B1 | 5/2001 | Downs et al. |
| 6,229,894 | B1 | 5/2001 | Van Oorschot et al. |
| 6,246,767 | B1 | 6/2001 | Akins, III et al. |
| 6,310,956 | B1 | 10/2001 | Morito et al. |
| 6,358,596 | B1 | 3/2002 | Mehta et al. |

(Continued)

OTHER PUBLICATIONS

Bender et al. "Techniques for Data Hiding" IBM Systems Journal, vol. 35, Nos. 3&4, pp. 313-336.

(Continued)

*Primary Examiner*—Christopher J Brown
(74) *Attorney, Agent, or Firm*—Ked & Associates LLP

(57) ABSTRACT

A method of digital media copy protection is disclosed. The method of the present invention is applicable to any type of digital media data and makes no assumptions on any specific media properties. The method includes a process of protecting digital media data with a public key using a hybrid cryptographic technique, a process of watermarking the media data, and an output device compliance testing process through an authenticated handshake protocol. Because of the media data protection with the hybrid cryptographic technique, a non-compliant playing device is not able to play or read a protected media data set. The output device compliance testing protocol is used to prevent the media signal from being copied to any non-compliant device. These features of the present invention are used to reduce the possibility of making any illegal copies on any nonstandard equipment. In addition, the data watermarking is used to modify the played and recorded media signals, to keep track of the identification information of the related devices for detecting any illegal copy maker, and to separate legal media data sets from the illegal data sets.

9 Claims, 2 Drawing Sheets

U.S. PATENT DOCUMENTS

| | | | | |
|---|---|---|---|---|
| 6,367,019 | B1 * | 4/2002 | Ansell et al. | 713/201 |
| 6,385,596 | B1 | 5/2002 | Wiser et al. | |
| 6,389,403 | B1 | 5/2002 | Dorak, Jr. | |
| 6,398,245 | B1 * | 6/2002 | Gruse et al. | 280/228 |
| 6,404,926 | B1 | 6/2002 | Miyahara et al. | |
| 6,418,421 | B1 | 7/2002 | Hurtado et al. | |
| 6,550,011 | B1 * | 4/2003 | Sims, III | 713/193 |
| 6,611,599 | B2 | 8/2003 | Natarajan | |
| 6,611,607 | B1 | 8/2003 | Davis et al. | |
| 6,633,723 | B1 | 10/2003 | Kuroda et al. | |
| 6,678,389 | B1 | 1/2004 | Sun et al. | |
| 6,678,464 | B1 * | 1/2004 | Kawai et al. | 386/94 |
| 6,687,822 | B1 | 2/2004 | Jakobsson | |
| 6,707,774 | B1 | 3/2004 | Kuroda et al. | |
| 6,741,991 | B2 | 5/2004 | Saito | |
| 6,802,011 | B1 | 10/2004 | Ogino | |
| 6,853,676 | B2 | 2/2005 | Kim | |
| 6,891,958 | B2 | 5/2005 | Kirovski et al. | |
| 7,000,113 | B1 | 2/2006 | Linnartz | |
| 7,002,710 | B1 | 2/2006 | Van Liew et al. | |
| 7,047,554 | B1 * | 5/2006 | Lortz | 725/149 |
| 7,100,048 | B1 | 8/2006 | Czajkowski et al. | |
| 2001/0010046 | A1 | 7/2001 | Muyers et al. | |
| 2001/0032312 | A1 | 10/2001 | Runje et al. | |
| 2001/0053223 | A1 | 12/2001 | Ishibashi et al. | |
| 2002/0010861 | A1 | 1/2002 | Matsuyama et al. | |
| 2002/0021805 | A1 | 2/2002 | Schumann et al. | |
| 2002/0071566 | A1 | 6/2002 | Kum | |
| 2002/0118838 | A1 | 8/2002 | Belenko et al. | |
| 2002/0191809 | A1 | 12/2002 | Kirovski et al. | |
| 2003/0048922 | A1 | 3/2003 | Rhoads | |
| 2004/0034781 | A1 | 2/2004 | Natarajan | |
| 2004/0059936 | A1 | 3/2004 | Wakao et al. | |
| 2004/0131184 | A1 | 7/2004 | Wu et al. | |
| 2005/0018873 | A1 | 1/2005 | Rhoads | |
| 2005/0058318 | A1 | 3/2005 | Rhoads | |
| 2005/0097333 | A1 | 5/2005 | Kirovski et al. | |
| 2005/0097334 | A1 | 5/2005 | Kirovski et al. | |
| 2005/0196013 | A1 | 9/2005 | Rhoads | |

OTHER PUBLICATIONS

F. Hartung and M. Kutter, Multimedia Watermaking Techniques, Proc. IEEE, vol. 87, No. 7, pp. 1079-1107, Jul. 1999.

Wolfgang et al., "Overview of image security techniques with applications in multimedia systems," Proceeding of the SPIE Conference on Multimedia Networks: Security, Displays, Terminals, and Gateways, vol. 3228, Nov. 2-5, 1997, Dallas, Texas, pp. 297-308.

* cited by examiner

COPY PROTECTION METHOD FOR DIGITAL MEDIA

CROSS-REFERENCE TO RELATED APPLICATIONS

This application claims the benefit of U.S. Provisional Application No. 60/265,884, filed on Feb. 5, 2001, in the name of inventors Vyacheslav S. Beleko and Vsebolod M. Kumich, titled "Copy Protection Architecture for Digital Media", which is hereby incorporated by reference as if fully set forth herein.

BACKGROUND OF THE INVENTION

1. Field of the Invention

The present invention relates to media copy protection, and more particularly, to a digital media copy protection method that provides a secure copy control of the digital media using hybrid cryptographic and watermarking techniques and an authenticated handshake protocol.

2. Discussion of the Related Art

Communication systems such as computer networks, telecommunication systems, and other systems are increasingly using cryptography for the security of information. There are two main classes of cryptographic systems: symmetric key and public key cryptographic systems. In a symmetric key cryptographic system, a symmetric (secrete) key is used for both of data encryption and decryption processes. There are several efficient implementations of the symmetric key cryptographic system, but the actual key managements of such implementations are often troublesome.

On the other hand, in a public key cryptographic system, the data encryption and decryption processes are independent from each other. That is, the data encryption process requires a public key, often designated as e, while the data decryption process requires a different (but mathematically related) private key d. Therefore, an entity being possessed of the public key may encrypt a plaintext, which is the original form of a message, but the entity may not be able decrypt a ciphertext, which is the encrypted form of the message.

If an entity selects a public key and publishes the public key, anyone is able to use the key to encrypt one or more messages for the entity. Then the entity keeps his private key secret so that he or she is the only one who can decrypt the ciphertexts of the messages. The implementations of the public key cryptographic system are currently less efficient than those of the symmetric key cryptographic systems, but they are much safer.

In a hybrid cryptographic system, a plaintext is encrypted with a symmetric key corresponding to a symmetric algorithm. The symmetric key is then encrypted with a public key corresponding to a public algorithm. When a receiver receives the public key-encrypted symmetric key and the symmetric key-encrypted data, the receiver initially decrypts the symmetric key by using his own private key. Subsequently, the receiver decrypts the encrypted data by using the decrypted symmetric key. The processes of obtaining the original data in a hybrid cryptographic system are usually faster than those of the public key cryptographic system. In addition, a hybrid cryptographic system may allow using a different symmetric key each time, considerably enhancing the security of the symmetric algorithm. For that reason, the hybrid cryptographic systems are ideal for transferring the protected media data safely to a receiver.

Watermarking is a technology, in which copyright information (information indicating a copy guard) is expressed by a watermark superposed in media data. Such information is embedded into various media data including image data and sound data, and it should be invisible and inaudible to a human observer. The purpose of superposing a watermark in the media data is to provide a proof of a copyright so that an illegal use and copy of the media data can be prevented. Therefore, the copyright information should stay stable in a host signal even when the host signal is subjected to any data process.

The technique for superposing a watermark in the media data depends on the size of the watermark data and the invariance of the watermark data to any data process of a host signal. There is a watermark inherent trade-off between the human perceptibility, bandwidth, and robustness (i.e., the degree to which the data are immune to be attacked or transformations that occur to the host signal through a normal usage). The more data to be superposed, the less secure the encoding process is. The less data to be superposed, the more secure the encoding process is.

In a cryptographic system, an entity ensures whether other entities are approved through an authentication process. The authentication process is usually implemented in the form of a handshake protocol. During a handshake process, authenticating entities exchange the randomly generated data together with their identity identifications. After the result of the handshake process is analyzed, the decision of authenticating of a counterpart entity is made. In order to make the handshake process more secure and resistant to any man-in-the-middle attacks, a public key cryptographic system is often used.

SUMMARY OF THE INVENTION

Accordingly, the present invention is directed to a copy protection method for digital media data that substantially obviates one or more problems due to limitations and disadvantages of the related art.

An object of the present invention is to provide a copy protection method that protects a digital media data set by allowing only compliant devices having a compliant secret key to play or read the media data set.

Another object of the present invention is to provide a copy protection method that protects a digital media data set by controlling its playing and recording processes with a digital watermarking technique.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a first copy protection method for digital media includes encrypting an original media data set with a media key having a symmetric algorithm and encrypting the media key with each public key of compliant devices; delivering the encrypted media data set and the encrypted media key to a compliant playing device; decrypting the delivered media key with a private key of the playing device; and (d) decrypting the delivered media data set with the decrypted media key.

The first method further includes adding a player watermark to the decrypted media data set if the decrypted data set is not marked with "free copy", the player watermark containing a player identification of the playing device and player copy-control information; encrypting the watermark-added media data set with the decrypted media key and encrypting the decrypted media key with the each public key of compliant devices; and passing the encrypted media data set and media key to a compliant recording device.

In another aspect of the present invention, a second copy protection method for digital media includes encrypting an original media data set with a media key having a symmetric algorithm and encrypting the media key with each public key of compliant devices; delivering the encrypted media data set and the encrypted media key to a compliant playing device; decrypting the delivered media key with a private key of the playing device; and decrypting the delivered media data set with the decrypted media key.

The second method further includes adding a player watermark to the decrypted media data set if the decrypted data set is not marked with "free copy", the player watermark containing a player identification of the playing device and player copy-control information; performing a compliance test through an authentication handshake process between the playing device and a displaying device; and transferring the watermark-added media data set to the displaying device only if the displaying device passes the test.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
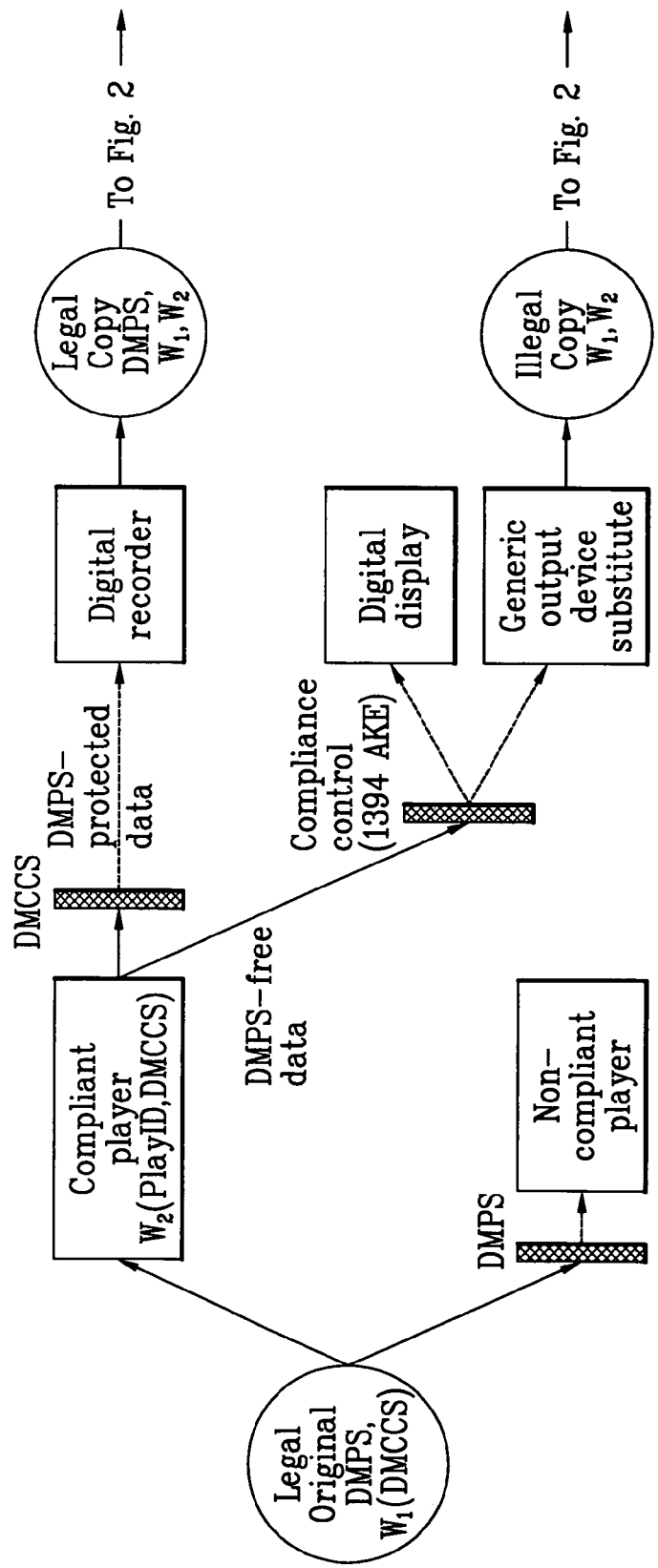
FIG. 1 illustrates the first stage of the digital media copy control method according to the present invention.
Figure 2:
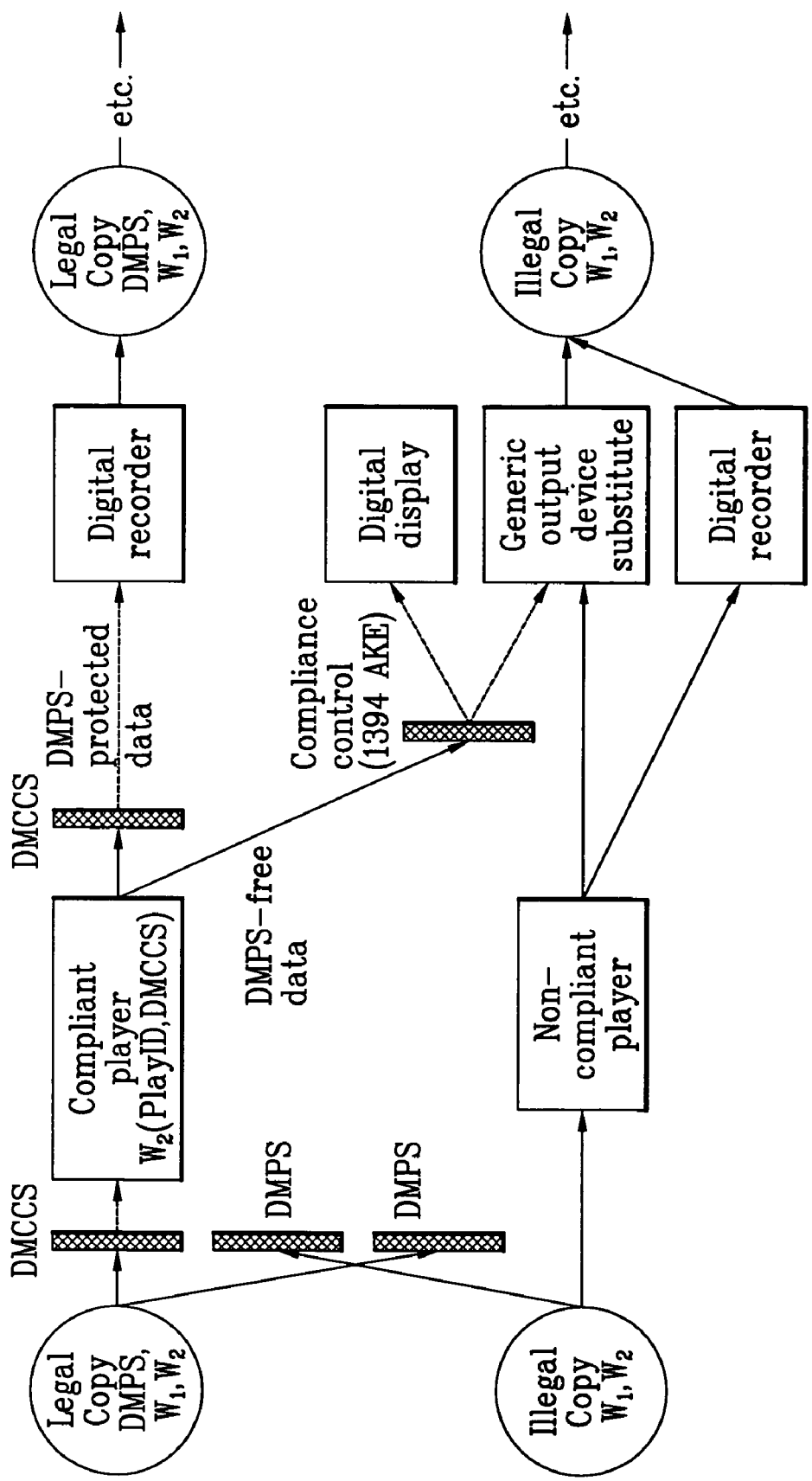
FIG. 2 illustrates the second and subsequent stages of the digital media copy protection method according to the present invention.

A digital media copy process can be divided into two steps. First, a playing device reads (plays) a media data set, and the played data set is outputted to a displaying device or is recorded by a recording device. FIG. 1 and FIG. 2 illustrate the first stage and the second and subsequent stages of the digital media copy protection method according to the present invention, respectively. In both figures, the full lines, hatched elements, and dotted lines represent the media data streams, the result of the protection system application, and the data streams filtered by the protection system.

When a media data set is encrypted by using a hybrid cryptographic technique, only compliant playing devices are able to play the encrypted media data set. In a hybrid cryptographic system, a media data set is encrypted with a media key (symmetric key) corresponding to a symmetric algorithm. The symmetric key is also encrypted with a public key algorithm by using the public key of a compliant playing device. Then the encrypted symmetric key and the encrypted media data set are delivered to one or more target playing devices. The encryption process of the symmetric key is performed for the public key of each compliant playing device. Each complaint playing device uses its own private key to decrypt the encrypted media key (symmetric key). The cryptographic levels of the public-key encryption of the media key and the media-key encryption of the media data set are chosen so that the encrypted data are safe enough to resist against any known types of attacks. The cryptographic system described above is called Digital Media Protection System (DMPS), which are shown in FIG. 1 and FIG. 2.

When a compliant playing device plays an original media data set, the compliant playing device is able to embed a player watermark in the played media signal if it has a watermarking capability. The original media signal should contain an owner watermark (W1) that includes owner identification and copy control information. The player watermark includes player identification and modified copy control information derived from the owner copy control information. For any media data set marked with "free copy", the compliant playing device should not embed the player watermark.

After the compliant playing device decrypts the encrypted media data set and subsequently adds the player watermark into the media data set, the playing device passes the digital media signal to an output device, which is generally one of a digital display device and a digital recording device. When the media signal is outputted to a digital display device, the media signal should not be DMPS protected. On the other hand, when the media signal is outputted to a recording device, the media signal should be DMPS protected. That is, the media signal must include the DPMS infrastructure in order to provide compliance of the recording device with the playing device. In addition, when the media data set is transferred to the displaying device, the data set must contain a player watermark with copy control information set to "for display only".

In order to prevent any data interception between the playing and displaying devices, a copy protected digital transmission protocol (e.g., 1394 with AKE) must be used. The protocol provides the compliance testing between the devices through an authenticated handshaking process. If the authentication of a displaying device is not approved, the media data set should not be transferred to the displaying device. Virtually, there is a chance that a generic recording device having a valid device certificate may substitute the displaying device and may mislead the AKE process. Therefore, the protection system according to the present invention may be considered as theoretically surmountable, and illegal copies may be made in such a way. Of course, the copies will contain the owner and player watermarks.

When the playing device passes the media data set to a recording device, the playing device will output the data set in the DMPS-protected form as the data set stored in the original media data set. Thus, no additional data transfer protection is required. A compliance test of the recording device is optional because any recording device will be a "dump-only" device for the data set received from the playing device.

When a legal media copy is played on a compliant playing device, Digital Media Copy Control System (DMCCS) will operate. If the media data set contains owner and player watermarks whose copy control information are not correlated with each other, or if the player watermark is marked with "for display only", the media data set will be rejected by the playing device. When an original media data set or its copy is about to be transferred to a recording device, the playing device's DMCCS initially checks the watermark copy control information and prevents the media data set from being copied if the media data set is marked with "no copy."

A legal media data set and its copy will not be compatible with a non-compliant playing device because they are DMPS-protected. An illegal copy is incompatible with a compliant playing device for the same reason. Therefore, this feature of the present invention will stop an ordinary user from using any illegal copy of a media data set. Moreover, a player watermark contains the individual identification of every playing device so that an origin of any illegal copy can be found.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A copy protection method for digital media, the method comprising the steps of:
    (a) encrypting an original media data set with a media key having a symmetric algorithm and encrypting said media key with a public key of a compliant device;
    (b) delivering said encrypted media data set and said encrypted media key to a compliant playing device, wherein said original media data set includes an owner watermark containing an owner identification and owner copy-control information for the media data set;
    (c) decrypting said delivered media key with a private key of said playing device;
    (d) decrypting said delivered media data set with said decrypted media key;
    (e) adding a player watermark to said decrypted media data set if said decrypted data set is not marked with at least "free copy", said player watermark containing a player identification of said playing device and player copy-control information, wherein said player copy-control information is derived from said owner copy-control information; and
    (f) if passing said watermark-added media set to a recording device. encrypting said watermark-added media data set with said decrypted media key, encrypting said decrypted media key with said public key of said compliant device, and passing said encrypted watermark added media data set and said encrypted media key to said recording device without a compliance test, and (e) if passing said-watermark-added media data to a displaying device, performing a compliance test with said displaying device and if said compliance test is successful, passing said watermark-added media data set and said decrypted media key to said displaying device without encrypting.

2. The method of claim 1, wherein said public key corresponds to an asymmetric algorithm.

3. The method of claim 1, wherein said player copy-control information is set to "for display only" if said media data set is passed to said displaying device.

4. A copy protection method for digital media, the method comprising:
    (a) receiving an encrypted media data set, a control information, and an encrypted media key, wherein the encrypted media data is generated by an original media data set with a media key and the encrypted media key is generated by encrypting said media key with a public key of a compliant device, wherein the control information includes owner identification of media data set and a copy control information to indicate whether a copy of the media data set permitted;
    (b) decrypting said received media key with a private key of said compliant device, and decrypting said received media data set with said decrypted media key;
    (c) adding a device information to the media data set to indicate an origin of the media data set, said device information including a device identification and copy-control information, wherein said copy-control information is derived from said owner copy-control information; and
    (d) outputting said media data set to which the device information is added, to an external device, wherein said outputting comprises (e) if said external device is a recording device, encrypting said media data set with said decrypted media key and outputting without a compliance test, and (f) if said external device is a displaying device, performing a compliance test with said displaying device and outputting without encrypting.

5. The method of claim 4, wherein said compliance test is performed through an authentication process between said compliant device and said displaying device wherein said step (d) outputs said media data set to which the device information is added only if said authentication is successful.

6. The method of claim 4, wherein said player copy control information is set to "for display only" if said media data set is passed to said displaying device.

7. A copy protection system for digital media, the system comprising:
    a receiving unit configured for receiving an encrypted media data set, a control information, and an encrypted media key, wherein the encrypted media data is generated by an original media data set with a media key and the encrypted media key is generated by encrypting said media key with a public key of a compliant device, wherein the control information includes owner identification of media data set and a copy control information to indicate whether a copy of the media data set is permitted;
    a decrypting unit configured for decrypting said received media key with a private key of said compliant device, and decrypting said received media data set with said decrypted media key;
    a watermark adder configured for adding a device information to the media data set to indicate an origin of the media data set, said device information including a device identification and copy-control information, wherein said copy-control information is derived from said owner copy-control information; and
    an output unit configured for outputting said media data set to which the device information is added, to an external device, wherein said output unit encrypts said media data set with said decrypted media key and outputs without a compliance test if said external device is a recording device, while said output unit performs a compliance test with said displaying device and outputs without encrypting if said external device is a displaying device.

8. The system of claim 7, wherein said compliance test is performed through an authentication process between said compliant device and said displaying device, wherein said output unit is configured for outputting said media data set to which the device information is added only if said authentication is successful.

9. The system of claim 7, wherein said player copy-control information is set to "for display only" if said media data set is passed to said displaying device.

* * * * *